Sept. 19, 1950   R. J. BAILLY   2,522,493
INFRARED ADAPTER FOR OPTICAL APPARATUS
Filed Sept. 16, 1948

René Jean Bailly,
Inventor.
Haynes and J Koenig,
Attorneys.

Patented Sept. 19, 1950

2,522,493

UNITED STATES PATENT OFFICE 2,522,493

INFRARED ADAPTER FOR OPTICAL APPARATUS

René Jean Bailly, University City, Mo.

Application September 16, 1948, Serial No. 49,550

4 Claims. (Cl. 250—165)

This invention relates to infrared adaptors for optical apparatus and, more particularly, to infrared adaptors for use with such optical apparatus as microscopes, refractometers, goniometers and spectrometers.

Among the several objects of the invention may be noted the provision of an infrared adaptor for attachment to such optical apparatus as microscopes, refractometers, goniometers and spectrometers for adapting such apparatus for the direct examination of specimens in infrared light; the provision of an adaptor of the class described particularly for permitting direct examination of specimens opaque to visible light in invisible infrared light by converting the invisible infrared image to a visible image; the provision of an adaptor of this class which is particularly useful with a microscope for the examination of interference figures; and the provision of an adaptor such as described which is readily attachable to and detachable from microscopes and other optical apparatus so that they may be used for their usual purposes without the adaptor whenever desired. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
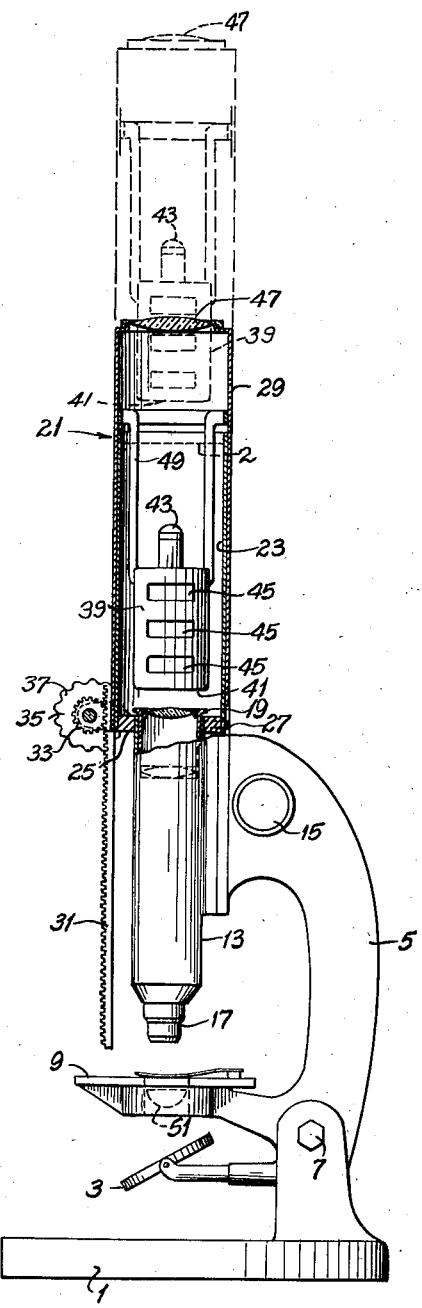
Figure 2:
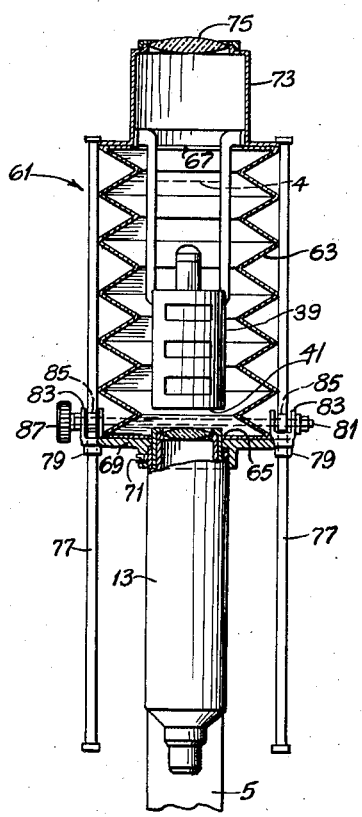

In the accompanying drawing, in which several of various possible embodiments of the invention are illustrated, Fig. 1 is a cross section of a microscope showing an adaptor of this invention attached thereto, the dotted lines showing certain retracted and removed positions of certain adaptor parts; and Fig. 2 is a cross section showing an alternative embodiment.

Similar reference characters indicate corresponding parts throughout the several views of the drawings.

This invention has for its particular purpose the provision of apparatus whereby it is possible to study the optical properties of many opaque minerals using the basic techniques employed for studying non-opaque minerals. I have found that many minerals, molybdenite for example, though opaque to visible light even in thin sections, transmit infrared light and may be effectively studied by such light if some means is provided for rendering visible to the eye the invisible infrared images transmitted through the mineral specimens. This invention provides apparatus whereby a microscope, for example, may be readily adapted for such infrared studies, and whereby observations may be made directly with the eye, without requiring exposure of infrared-sensitive photographic plates or like procedures. By means of the invention, for example, it is possible directly to study by transmitted infrared light a specimen of molybdenite one-half millimeter thick, though specimens of this mineral one-one-hundredth millimeter thick are opaque to visible light and cannot be studied by transmitted visible light. The apparatus is also particularly adapted for the direct observation of infrared interference figures, obtained by transmitting convergent infrared rays through the specimen.

Fig. 1 illustrates a first embodiment of the invention applied to a conventional microscope, which may be either of the polarizing or non-polarizing type. At 1 is shown the base of the microscope carrying an adjustable mirror 3. A pillar 5 is pivotally carried by the base 1 by means of an inclination joint 7. On the pillar is a stage 9 having an aperture 11 over which a specimen to be studied is placed in position for transmission of light reflected from the mirror. At 13 is shown the usual microscope tube, which is adjustable toward and away from the stage 9 by means of the usual adjusting knob 15. At the lower end of the tube is the usual objective lens 17 and at its upper end, the ocular end of the tube, is the usual ocular 19.

The adaptor, which is generally designated 21, is detachably mounted upon the ocular end of the microscope tube 13. It comprises a two-part extensible casing consisting of a barrel 23, having at its lower end a collar 25 which has a light-tight fit around the upper end of the tube 13 and is detachably fixed thereto as by means of a set screw 27. A sleeve 29 is telescoped on the barrel 23 having a light-tight sliding fit therewith. The sleeve 29 may be manually adjusted by sliding with respect to the barrel in the manner of a simple telescope, but a rack and pinion or equivalent adjusting means for effecting such adjustment is preferably provided. As shown in Fig. 1, the outside sleeve 29 is provided with a rack 31 with which meshes a pinion 33 for driving the sleeve up or down on the barrel. The pinion is journalled in bearing brackets 35 extending from the lower end of the barrel and has an adjusting knob 37.

Mounted within the sleeve 29 for adjustment therewith is an electronic infrared image converter tube 39 of known type having an infrared-sensitive cathode 41 at its lower end, a fluorescent screen 43 at its upper end, and internal annular electrodes 45 for electrically focusing upon screen 43 the stream of electrons emitted from the cathode. The cathode emits electrons in a pattern according to invisible infrared light striking it. This pattern is converted to a visible image upon the fluorescent screen 43, which may be viewed directly through a lens 47 mounted in a viewing aperture in the upper end of the sleeve. An infrared converter tube particularly suitable for the purpose is that designated No. 1P25, manufactured by the Radio Corporation of America and the Farnsworth Company. The tube 39 may be conveniently mounted within the sleeve by means of its electrical leads, as indicated at 49. The leads may be supplied with voltage through a flexible connection (not shown) from a suitable electrical source.

In use, a specimen is placed as usual on the microscope stage 9 over the aperture 11. A source of infrared light (not shown) is positioned to reflect a beam of infrared from the mirror 3 through the aperture and through the specimen to the microscope. The resultant magnified infrared image striking the cathode 41 of the converter tube 39 is reproduced as a visible image upon the screen 43, the visible image being observed through the lens 47 in the upper end of the sleeve 29. The image is placed in focus by adjusting the microscope tube 13, along with the adaptor 21, toward or away from the specimen as required, by means of adjusting knob 15. For usual studies, the sleeve 29 is adjusted to a position wherein the cathode 41 of the converter tube 39 is relatively close to the ocular end of the microscope tube, as illustrated in solid lines in Fig. 1. For observing interference figures under infrared in polarized light, a hemispherical lens, such as illustrated in dotted lines at 51 in Fig. 1, is positioned under the specimen to cause a cone of diverging infrared rays to be transmitted through the specimen. To produce clear visible interference figures with the use of a Bertrand lens on the screen 43 of the converter tube, the sleeve 29 is moved away from the microscope tube 13 to a position such as illustrated in dotted lines in Fig. 1 wherein the lower end of the sleeve is indicated by the dotted line 2 and the cathode 41 of the converter tube is farther away from the ocular end of the microscope tube than required for direct examination of ordinary images.

Fig. 2 illustrates an alternative embodiment of the invention comprising an adaptor, generally designated 61, mounted upon the microscope tube 13. The adaptor 61 comprises an extensible casing consisting of an extensible light-tight bellows 63 having openings 65 and 67 at its lower and upper ends, respectively. At the lower end of the bellows is a collar 69 by means of which it may be detachably mounted upon the ocular end of the microscope tube 13 in substantially light-tight relation therewith, and retained in such position by a set screw 71. On the upper end of the bellows is an eyepiece 73 having a viewing aperture in which is mounted a lens 75. Means for adjusting the bellows is shown to comprise a pair of rods 77 fixed to the base of the eyepiece and extending downward through guides 79 provided on the collar 69. A transverse shaft 81 journalled in bearings 83 on the collar carries friction wheels 85 in engagement with the rods. A knob 87 on the end of the shaft may be turned to drive the rods up or down and thus to extend or contract the bellows. Obviously rack teeth may be cut on the rods 77 and the wheels 85 changed to meshing gears.

Mounted within the bellows 63 for adjustment therewith is the electronic image converter tube 39, with its cathode 41 facing the light inlet opening in the lower end of the bellows and its screen 43 facing the viewing aperture in the upper end of the bellows. The tube may be conveniently mounted within the bellows by means of its electrical leads 49, the latter being fixed to the upper end of the bellows. It will be readily understood that by adjusting the bellows, the converter tube 39 may be adjusted in position with its cathode relatively close to the ocular end of the microscope tube 13, or with its cathode relatively far from the ocular at a position such as indicated by the dotted line 4 either for examining interference figures, or obtaining a high magnification.

In each disclosed embodiment of the adaptor of this invention, the electronic image converter tube is enclosed in a casing which is quickly detachable from the optical apparatus upon which it is used (the microscope, for example), so that whenever desired the optical apparatus may be used for its usual purposes without the adaptor. In each instance, the converter tube is adjustable along with the microscope tube as the latter is adjusted for focusing purposes, and is also adjustable relatively to the microscope tube. Thus it is useful for observing ordinary internal structure of an opaque specimen or for purposes of observing interference figures therefrom. In addition to its particular use for examining mineral specimens, it is useful for observing specimens in paleontology, biochemistry and allied sciences.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A non-visible-light-ray adaptor for use with optical apparatus which has an ocular lens and which is adapted to be provided with means for projecting non-visible light rays through a specimen under examination in such manner as to produce interference figures, said adaptor comprising a light-tight extensible casing having an opening at one end adapted for attachment to the ocular end of an optical apparatus, means at said end of the adaptor for detachably securing it to the ocular end of the apparatus, the other end of said extensible casing having a viewing aperture therein and being movable upon retraction or extension of the casing toward and away from the said one end of the casing, an electronic non-visible light ray converter tube carried by and within the extensible casing and fixed with respect to said other end of the casing so as to be movable therewith, said tube having a non-visible-light-ray-sensitive cathode at one end thereof facing the opening in said one end of the casing and a screen for producing a visible image at its other end facing the viewing aperture, the extensibility of the casing being such that the tube may be moved between a position wherein its cathode is adjacent the opening in said one end of the casing and thereby adapted to be located close to the ocular of an optical apparatus to which the adaptor may be attached for observation of ordinary images, and a position wherein its cathode is relatively far from the said one end of the casing and at a distance suitable for observation of interference figures.

2. An infrared ray adaptor for use with optical apparatus which has objective and ocular lenses and which is adapted to be provided with means for projecting infrared rays through a specimen under examination in such manner as to produce interference figures, said adaptor comprising a light-tight extensible casing having an opening at one end adapted to receive the ocular end of an optical apparatus to which it is attached, means at said end of the adaptor for detachably securing the adaptor to the ocular end of the apparatus, the other end of said extensible casing having a viewing aperture therein and being movable upon retraction or extension of the casing toward and away from the said one end of the casing, an electronic infrared ray converter tube carried by and within the extensible casing and fixed with respect to said other end of the casing so as to be movable therewith, said tube having an infrared-sensitive cathode at one end thereof facing the opening in said one end of the casing and a screen for producing a visible image at its other end facing the viewing aperture, the extensibility of the casing being such that the tube may be moved between a position wherein its infrared-sensitive cathode is adjacent the opening in said one end of the casing and thereby adapted to be located close to the ocular of an optical apparatus to which the adaptor may be attached for observation of ordinary images, and a position wherein its infrared-sensitive cathode is relatively far from the said one end of the casing and at a distance suitable for observation of interference figures.

3. An infrared ray adaptor for use with optical apparatus which has objective and ocular lenses and which is adapted to be provided with means for projecting infrared rays through a specimen under examination in such manner as to produce interference figures, said adaptor comprising a light-tight extensible casing consisting of an open-ended barrel having means at one end for detachably securing it over the ocular end of an optical apparatus, and a sleeve telescoped with the barrel and movable toward and away from the said one end of the barrel, a lens in the end of the sleeve remote from said one end of the barrel, an electronic infrared ray converter tube carried by the sleeve within the extensible casing and movable with the sleeve, said tube having an infrared-sensitive cathode at one end thereof facing the said one end of the barrel and a screen for producing a visible image at its other end facing the lens at the end of the sleeve, the extensibility of the sleeve being such that the tube may be moved between a position wherein its infrared-sensitive cathode is adjacent the said one end of the barrel and thereby adapted to be located close to the ocular of an optical apparatus to which the adaptor may be attached for observation of ordinary images, and a position wherein its infrared-sensitive cathode is relatively far from the said one end of the barrel and at a distance suitable for observation of interference figures.

4. An infrared ray adaptor for use with optical apparatus which has objective and ocular lenses and which is adapted to be provided with means for projecting infrared rays through a specimen under examination in such manner as to produce interference figures, said adaptor comprising a light-tight extensible bellows having an opening at one end adapted to receive the ocular end of the optical apparatus to which it is attached, means at said end of the bellows for detachably securing it to the ocular end of the apparatus, the other end of the extensible bellows having a viewing lens therein and being movable upon retraction or extension of the bellows toward and away from the said one end of the bellows, an electronic infrared ray converter tube carried by and within the extensible bellows and fixed with respect to said other end of the bellows so as to be movable therewith, said tube having an infrared-sensitive cathode at one end thereof facing the opening in said one end of the bellows and a screen for producing a visible image at its other end facing the viewing lens, the extensibility of the bellows being such that the tube may be moved between a position wherein its infrared-sensitive cathode is adjacent the opening in said one end of the bellows and thereby adapted to be located close to the ocular of an optical apparatus to which the adaptor may be attached for observation of ordinary images, and a position wherein its infrared-sensitive cathode is relatively far from the said one end of the bellows and at a distance suitable for observation of interference figures.

RENÉ JEAN BAILLY.

REFERENCES CITED

The following references are of record in the file of this patent:

UNITED STATES PATENTS

| Number | Name | Date |
| --- | --- | --- |
| 1,936,514 | Lengnick | Nov. 21, 1933 |
| 2,058,941 | Arnhym | Oct. 27, 1936 |
| 2,120,916 | Btiner | June 14, 1938 |
| 2,258,436 | Von Ardenne | Oct. 7, 1941 |
| 2,427,689 | Osterberg et al. | Sept. 23, 1947 |